United States Patent
Mestan et al.

(10) Patent No.: US 8,489,866 B2
(45) Date of Patent: Jul. 16, 2013

(54) BRANCH TRACE HISTORY COMPRESSION

(75) Inventors: Brian Robert Mestan, Austin, TX (US); Mauricio Jose Serrano, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 12/827,916

(22) Filed: Jun. 30, 2010

(65) Prior Publication Data

US 2012/0005463 A1 Jan. 5, 2012

(51) Int. Cl.
*G06F 9/00* (2006.01)

(52) U.S. Cl.
USPC ............................ 712/227; 712/234

(58) Field of Classification Search
None
See application file for complete search history.

(56) References Cited

U.S. PATENT DOCUMENTS

| | | | |
|---|---|---|---|
| 5,473,754 A * | 12/1995 | Folwell et al. | 714/45 |
| 5,621,886 A * | 4/1997 | Alpert et al. | 714/38.13 |
| 5,809,293 A * | 9/1998 | Bridges et al. | 712/227 |
| 5,862,371 A | 1/1999 | Levine et al. | |
| 5,875,325 A | 2/1999 | Talcott | |
| 6,173,395 B1 * | 1/2001 | Wisor et al. | 712/236 |
| 6,233,678 B1 | 5/2001 | Bala | |
| 6,247,146 B1 | 6/2001 | Wheatley et al. | |
| 6,658,557 B1 * | 12/2003 | McCoy et al. | 712/227 |
| 6,813,763 B1 | 11/2004 | Takahashi et al. | |
| 2003/0051122 A1 * | 3/2003 | Sato | 712/227 |
| 2006/0155971 A1 * | 7/2006 | Robert et al. | 712/227 |
| 2006/0230391 A1 * | 10/2006 | Alexander et al. | 717/130 |
| 2006/0294343 A1 * | 12/2006 | Rejmaniak | 712/227 |
| 2007/0294592 A1 * | 12/2007 | Ashfield et al. | 714/45 |
| 2008/0276081 A1 | 11/2008 | Nair | |
| 2010/0064123 A1 | 3/2010 | Zuraski, Jr. et al. | |

OTHER PUBLICATIONS

Barr et al., "Branch Trace Compression for Snapshot-Based Simulation", IEEE Int'l symposium onPerformance Analysis of Systems and Software (ISPASS), Austin TX, Mar. 2006, pp. 1-12.
"Partial Address Recording in Branch History Tables", IBM Technical Disclosure Bulletin, V36, n6B, 06-93, pp. 379-380 IP.com electronic publn. Mar. 19, 2005.
"Branch History Indexing with Execution Path Information", IBM Technical Disclosure Bulletin, V36, n8, 08-93, pp. 557-558 IP.com electronic publn. Mar. 20, 2005.
Lu et al., "Design and Implementation of a Lightweight Dynamic Optimization System", Journal of Instruction Level Parallelism, Apr. 2004, pp. 1-24.

(Continued)

*Primary Examiner* — Keith Vicary
(74) *Attorney, Agent, or Firm* — Yee & Associates, P.C.; Libby Z. Toub (57) ABSTRACT

A method, data processing system, and computer program product for managing a branch trace environment. In response to a branch being taken for a first branch instruction that is conditional and direct in the branch instructions, a performance monitoring unit stores an effective address of the first branch instruction into a first entry in a set of entries in a memory. The performance monitoring unit counts each branch not taken in processing the branch instructions occurring after the first branch instruction to form a branch count. In response to a branch being taken during processing of subsequent branch instructions in the branch instructions after the first branch instruction, the performance monitoring unit determines whether to create a second entry in the set of entries in the memory using the branch count with a set of rules identifying when the second entry is to be made.

17 Claims, 6 Drawing Sheets

OTHER PUBLICATIONS

Merten et al., "A hardware-driven profiling scheme for identifying program hot spots to support runtime optimization" International Symposium on Computer Architecture archive, Proceedings of the 26th annual international symposium on Computer architecture, Atlanta, Georgia, 1999, pp. 136-147.

Bala et al., "Dynamo: a transparent dynamic optimization system", Conference on Programming Language Design and Implementation, Proceedings of the ACM SIGPLAN 2000 Conference on Programming Language Design and Implementation, Vancouver, Canada, 2000, pp. 1-12.

"Intel® Itanium® 2 Processor Reference Manual for Software Development and Optimization", Jun. 1, 2010 retrieve from: http://www.intel.com/design/itanium2/manuals/251110.htm.

"Intel 64 and IA-32 Software Developers Manual vol. 3B: System Programming" Jun. 1, 2010, retrieve from: http://www.intel.com/products/processor/manuals/.

* cited by examiner

BRANCH TRACE HISTORY COMPRESSION

BACKGROUND

1. Field

The present disclosure relates generally to an improved data processing system and, more particularly, to a method and apparatus for tracking instructions. Still, more particularly, the present disclosure relates to a method and apparatus for tracking a flow history of a program using compression.

2. Description of the Related Art

Optimizing compilers and runtime code optimizers provide significant performance benefits. These optimizations may include performing code transformations based on a runtime profile of a program. One of the most useful runtime profiles is capturing the control flow history of a program. The control flow history is the order in which individual instructions or function calls of a program were executed. Knowledge of the control flow history can drive powerful program optimizations, such as function in-lining, code cloning, superblock formation, prefetch insertion, among other applications.

A control flow history of a program can be represented by a list of the branch instructions that were taken in its execution. Branch instructions are points in a program where a choice is made as to which of two or more paths should be followed. Knowing the outcome of each branch instruction allows a code optimizer to determine the sequence of instructions that were followed in the runtime execution of the program code.

SUMMARY

In one illustrative embodiment, a method is present for monitoring processing of branch instructions. In response to a branch being taken for a first branch instruction that is conditional and direct in the branch instructions, a performance monitoring unit stores an effective address of the first branch instruction into a first entry in a set of entries in a memory. The performance monitoring unit counts each branch not taken in processing the branch instructions occurring after the first branch instruction to form a branch count. In response to a branch being taken during processing of subsequent branch instructions in the branch instructions after the first branch instruction, the performance monitoring unit determines whether to create a second entry in the set of entries in the memory using the branch count with a set of rules identifying when the second entry is to be made. In response to a determination to create the second entry, the performance monitoring unit, i) creates the second entry in the set of entries in the memory; and ii) stores the branch count and an indication the branch was taken for the subsequent branch instruction in the second entry.

In yet another illustrative embodiment, an apparatus comprises a bus system, a memory connected to the bus system, a processor unit connected to the bus system, and a branch trace table. In response to a branch being taken for a first branch instruction that is conditional and direct in the branch instructions, a performance monitoring unit stores an effective address of the first branch instruction into a first entry in a set of entries in a memory. The performance monitoring unit counts each branch not taken in processing the branch instructions occurring after the first branch instruction to form a branch count. In response to a branch being taken during processing of subsequent branch instructions in the branch instructions after the first branch instruction, the performance monitoring unit determines whether to create a second entry in the set of entries in the memory using the branch count with a set of rules identifying when the second entry is to be made. In response to a determination to create the second entry, the performance monitoring unit, i) creates the second entry in the set of entries in the memory; and ii) stores the branch count and an indication the branch was taken for the subsequent branch instruction in the second entry.

In yet another illustrative embodiment, a computer program product comprises a computer usable storage medium including computer usable program code for monitoring processing of branch instructions. The computer program product comprises computer usable program code for storing an effective address of the first branch instruction into a first entry in a set of entries in a memory in response to a branch being taken for a first branch instruction that is conditional and direct in the branch instructions. The computer program product comprises computer usable program code for counting each branch not taken in processing the branch instructions occurring after the first branch instruction to form a branch count. The computer program product comprises computer usable program code for determining determines whether to create a second entry in the set of entries in the memory using the branch count with a set of rules identifying when the second entry is to be made in response to a branch being taken during processing of subsequent branch instructions in the branch instructions after the first branch instruction. In response to a determination to create the second entry, the computer program product comprises computer usable program code for, i) creating the second entry in the set of entries in the memory; and ii) storing the branch count and an indication the branch was taken for the subsequent branch instruction in the second entry.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to, wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
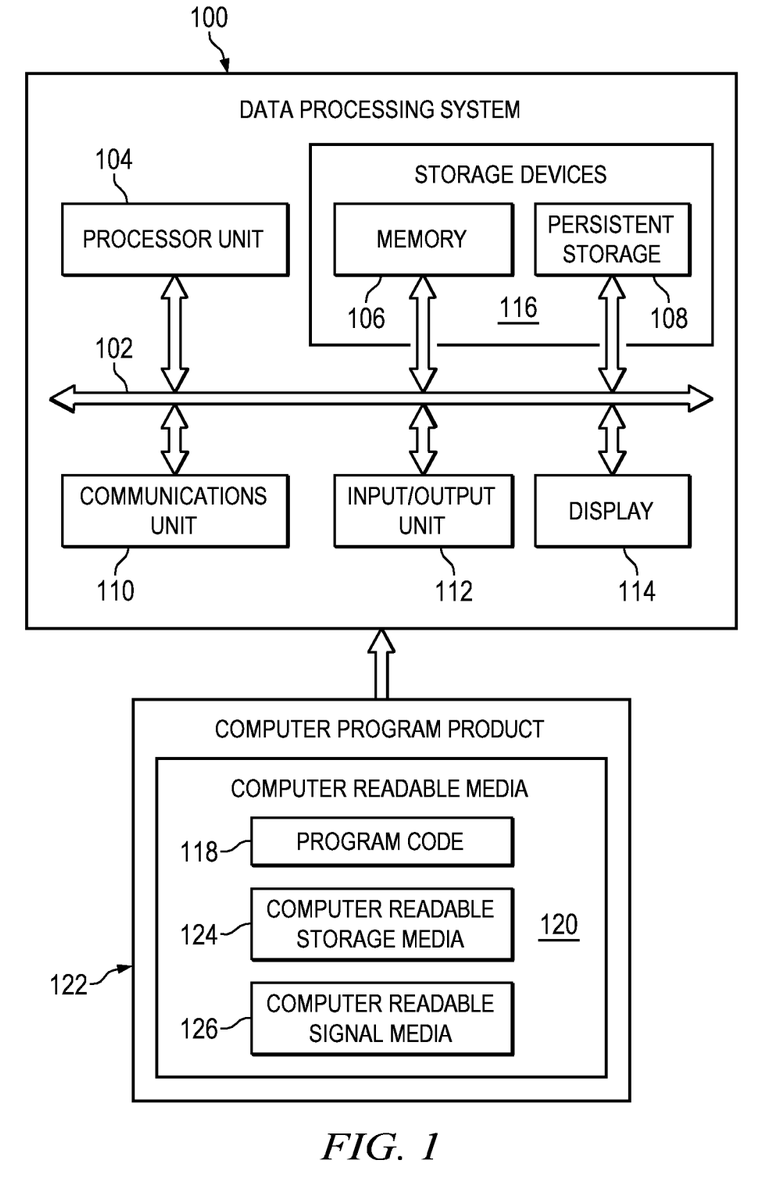
FIG. 1 is an illustration of a data processing system depicted in accordance with an illustrative embodiment.

Turning now to FIG. 1, an illustration of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of processors, a multi-processor core, or some other type of processor, depending on the particular implementation. A set, as used herein with reference to an item, means one or more items. Further, processor unit 104 may be implemented using a set of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for processing by processor unit 104. The processes of the different embodiments may be performed by processor unit 104 using computer implemented instructions, which may be located in a memory, such as memory 106.

These instructions are referred to as program code, computer-usable program code, or computer-readable program code that may be read and processed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for processing by processor unit 104. Program code 118 and computer readable media 120 form computer program product 122 in these examples. In one example, computer readable media 120 may be computer readable storage media 124 or computer readable signal media 126. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communication links, such as wireless communication links, optical fiber cable, coaxial cable, a wire, and/or any other suitable type of communications link. In other words, the communications link and/or the connection may be physical or wireless in the illustrative examples.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

Figure 2:
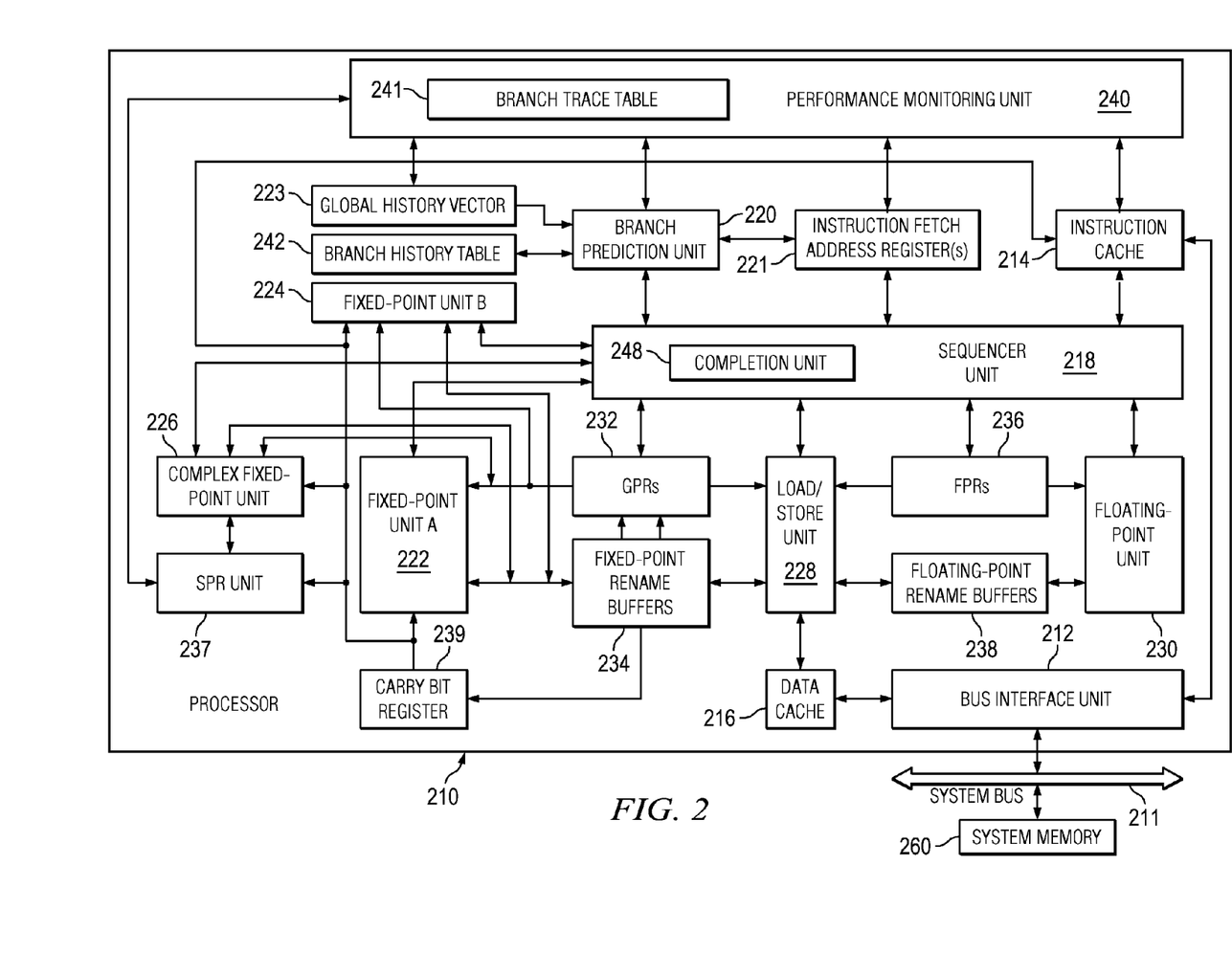
FIG. 2 is an illustration of a processor depicted in accordance with an illustrative embodiment.

With reference now to FIG. 2, an illustration of a processor is depicted in accordance with an illustrative embodiment. Processor 210 is an example of a processor that may be found in processor unit 104 in FIG. 1. One or more of processor 210 may be used in processor unit 104 in FIG. 1.

In an illustrative embodiment, processor 210 is an integrated circuit superscalar microprocessor. Processor 210 includes various units and different types of memory. The different types of memory may include at least one of a register, a buffer, and some other suitable type of memory. These components in processor 210 are implemented as integrated circuits. In addition, in the illustrative embodiment, processor 210 operates using reduced instruction set computer (RISC) techniques.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

System bus 211 connects to bus interface unit (BIU) 212 of processor 210. Bus interface unit 212 controls the transfer of information between processor 210 and system bus 211. Bus interface unit 212 connects to instruction cache 214 and to data cache 216 of processor 210. Instruction cache 214 outputs instructions to sequencer unit 218. In response to such instructions from instruction cache 214, sequencer unit 218 selectively outputs instructions to other circuitry in processor 210.

Processor 210 supports the processing of different types of instructions. Some instructions have a set of source operands that describe data used by the instructions. Source operands can be data or an indication of where the data is located. The data may be located in memory in processor 210. Additionally, some instructions have destination operands that describe where results of the instructions should be placed. Destination operands cause elements of processor 210 to place the result of the instruction in memory in processor 210.

The following example instruction has two source operands and a destination operand "fadd source operand a, source operand b, destination operand c." In this example, fadd stands for floating-point addition operator. During processing of the example fadd instruction, elements of processor 210 will process the fadd instruction by adding the value from source operand a to the value from source operand b and placing the result value into destination operand c.

In addition to sequencer unit 218, processor 210 includes multiple units. These units include, for example, branch prediction unit 220, fixed-point unit A (FXUA) 222, fixed-point unit B (FXUB) 224, complex fixed-point unit (CFXU) 226, load/store unit (LSU) 228, and floating-point unit (FPU) 230. Fixed-point unit A 222, fixed-point unit B 224, complex fixed-point unit 226, and load/store unit 228 input their source operand information from general-purpose architectural registers (GPRs) 232 and fixed-point rename buffers (PFRs) 234.

Moreover, fixed-point unit A 222 and fixed-point unit B 224 input a "carry bit" from carry bit (CA) register 239. Fixed-point unit A 222, fixed-point unit B 224, complex fixed-point unit 226, and load/store unit 228 output results of their operations for storage at selected entries in fixed-point rename buffers 234. These results are destination operand information. In addition, complex fixed-point unit 226 inputs and outputs source operand information and destination operand information to and from special-purpose register processing (SPR) unit 237.

Floating-point unit 230 inputs its source operand information from floating-point architectural registers (FPRs) 236 and floating-point rename buffers 238. Floating-point unit 230 outputs results of its operation for storage at selected entries in floating-point rename buffers 238. In these examples, the results are destination operand information.

In response to a load instruction, load/store unit 228 inputs information from data cache 216 and copies such information to selected ones of fixed-point rename buffers 234 and floating-point rename buffer 238. If such information is not stored in data cache 216, then data cache 216 inputs through bus interface unit 212 and system bus 211 the information from system memory 260 connected to system bus 211. Moreover, data cache 216 is able to output through bus interface unit 212 and system bus 211 information from data cache 216 to system memory 260 connected to system bus 211. In response to a store instruction, load/store unit 228 inputs information from a selected one of general-purpose architectural registers (GPRs) 232 and fixed-point rename buffers 234 and copies such information to data cache 216.

Sequencer unit 218 inputs and outputs information to and from general-purpose architectural registers (GPRs) 232 and fixed-point rename buffers 234. From sequencer unit 218, branch prediction unit 220 inputs instructions and signals indicating a present state of processor 210. In response to such instructions and signals, branch prediction unit 220 outputs to sequencer unit 218 and instruction fetch address register(s) (IFAR) 221 signals indicating suitable memory addresses storing a sequence of instructions for processing by processor 210.

In response to such signals from branch prediction unit 220, sequencer unit 218 fetches the indicated sequence of instructions from instruction cache 214. If one or more of the sequence of instructions is not stored in instruction cache 214, then instruction cache 214 inputs through bus interface unit 212 and system bus 211 such instructions from system memory 260 connected to system bus 211.

In response to the instructions input from instruction cache 214, sequencer unit 218 selectively dispatches the instructions to selected ones of branch prediction unit 220, fixed-point unit A 222, fixed-point unit B 224, complex fixed-point unit 226, load/store unit 228, and floating-point unit 230. Each unit processes one or more instructions of a particular class of instructions. For example, fixed-point unit A 222 and fixed-point unit B 224 perform a first class of fixed-point mathematical operations on source operands, such as addition, subtraction, ANDing, ORing and XORing. Complex fixed-point unit 226 performs a second class of fixed-point operations on source operands, such as fixed-point multiplication and division. Floating-point unit 230 performs floating-point operations on source operands, such as floating-point multiplication and division.

Information stored at a selected one of fixed-point rename buffers 234 is associated with a storage location. An example of a storage location may be, for example, one of general-purpose architectural registers (GPRs) 232 or carry bit (CA) register 239. The instruction specifies the storage location for which the selected rename buffer is allocated. Information stored at a selected one of fixed-point rename buffers 234 is copied to its associated one of general-purpose architectural registers (GPRs) 232 or carry bit register 239 in response to signals from sequencer unit 218. Sequencer unit 218 directs such copying of information stored at a selected one of fixed-point rename buffers 234 in response to "completing" the instruction that generated the information. Such copying is referred to as a "writeback."

As information is stored at a selected one of floating-point rename buffers 238, such information is associated with one of fixed-point rename buffers 234. Information stored at a selected one of floating-point rename buffers 238 is copied to its associated one of fixed-point rename buffers 234 in response to signals from sequencer unit 218. Sequencer unit 218 directs such copying of information stored at a selected one of floating-point rename buffers 238 in response to "completing" the instruction that generated the information.

Completion unit 248 in sequencer unit 218 tracks the completion of the multiple instructions. These instructions are instructions being processed within the units. When an instruction or a group of instructions have been completed successfully, in an sequential order specified by an application, completion unit 248 may be utilized by sequencer unit 218 to cause the transfer of the results of those completed instructions to the associated general-purpose registers. Completion unit 248 is located in memory in processor 210 in this illustrative example. In other illustrative examples, processor 210 may include hardware components that form completion unit 248.

A number of the different illustrative embodiments may be implemented within completion unit 248 in these examples. Completion unit 248 may include logic or other functions to track the completion of instructions in accordance with an illustrative embodiment.

Global history vector (GHV) 223 is connected to branch prediction unit 220 and performance monitoring unit 240. Global history vector 223 stores recent paths of instruction processing by processor 210. Global history vector 223 is stored in memory in processor 210.

Branch prediction unit 220 predicts whether a branch was based on the path of processing. This path may be identified by the history of the last few branches to have been processes.

Branch prediction unit 220 stores a bit-vector, referred to as a "global history vector," that represents the recent path of processing. Global history vector 223 stores bits of data. Each bit of data is associated with the instructions. The position of a bit in global history vector 223 indicates how recently the associated instructions were fetched. For example, bit-0 in global history vector 223 may represent the most recent fetch and bit-n may represent n fetches ago. If the instructions fetched contained a branch instruction whose branch was taken, then a "1" may be indicated in global history vector 223 corresponding to that instruction. Otherwise, a "0" may be indicated in global history vector 223.

Upon each successive fetch of instructions, global history vector 223 is updated by shifting in appropriate "1"s and "0"s and discarding the oldest bits. The resulting data in global history vector 223 when exclusive ORed with instruction fetch address register(s) 221 selects the branch instruction in branch history table 242 that was taken or not taken as indicated by the bit in global history vector 223.

Additionally, processor 210 includes performance monitoring unit 240 in these illustrative examples. Performance monitoring unit 240 is an example of hardware in which different illustrative embodiments may be implemented. As depicted, performance monitoring unit 240 connects to instruction cache 214, instruction fetch address register(s) 221, branch prediction unit 220, global history vector 223, and special-purpose register processing (SPR) unit 237.

Performance monitoring unit 240 receives signals from other functional units and initiates actions. In these examples, performance monitoring unit 240 obtains information about instructions. Performance monitoring unit 240 includes branch trace table 241.

Branch history table 242 is stored in memory in processor 210. Branch history table 242 stores branch predictions made by branch prediction unit 220. Branch trace table 241 stores information generated during the processing of instructions. For example, branch trace table 241 may store addresses for each branch instruction retired.

The different components illustrated for processor 210 are not meant to provide architectural limitations to the manner in which different embodiments may be implemented. The different illustrative embodiments may be implemented in a processor unit including components in addition to, or in place of, those illustrated for processor 210. Other components shown in FIG. 2 can be varied from the illustrative examples shown.

The different illustrative embodiments recognize and take into account that software techniques can be used to gather the list of taken branches. However, such techniques require expensive program instrumentation and therefore exhibit large overheads. Software techniques are adequate for static performance analysis, but are not sufficient for dynamic runtime environments where overhead needs to be kept at a small cost.

The different illustrative embodiments also recognize and take into account that prior processors have limited dedicated hardware support for recording branches, due to the area overhead of storing large 64-bit branch instructions and target addresses. Some microprocessors dedicate a large 16-entry circular stack of 128-bits per entry to store both the branch instructions effective address and its target address. The result is a very large piece of hardware, and yet only the history of the past 16 branches can be provided. Other processors with hardware support dedicate a small 4-entry circular stack for the branch address and the target address.

The different illustrative embodiments provide a method and apparatus for monitoring processing of branch instructions. In response to a branch being taken for a first branch instruction that is conditional and direct in the branch instructions, a performance monitoring unit stores an effective address of the first branch instruction into a first entry in a set of entries in a memory. The performance monitoring unit counts each branch not taken in processing the branch instructions occurring after the first branch instruction to form a branch count. In response to a branch being taken during processing of subsequent branch instructions in the branch instructions after the first branch instruction, the performance monitoring unit determines whether to create a second entry in the set of entries in the memory using the branch count with a set of rules identifying when the second entry is to be made. In response to a determination to create the second entry, the performance monitoring unit, i) creates the second entry in the set of entries in the memory; and ii) stores the branch count and an indication the branch was taken for the subsequent branch instruction in the second entry.

Figure 3:
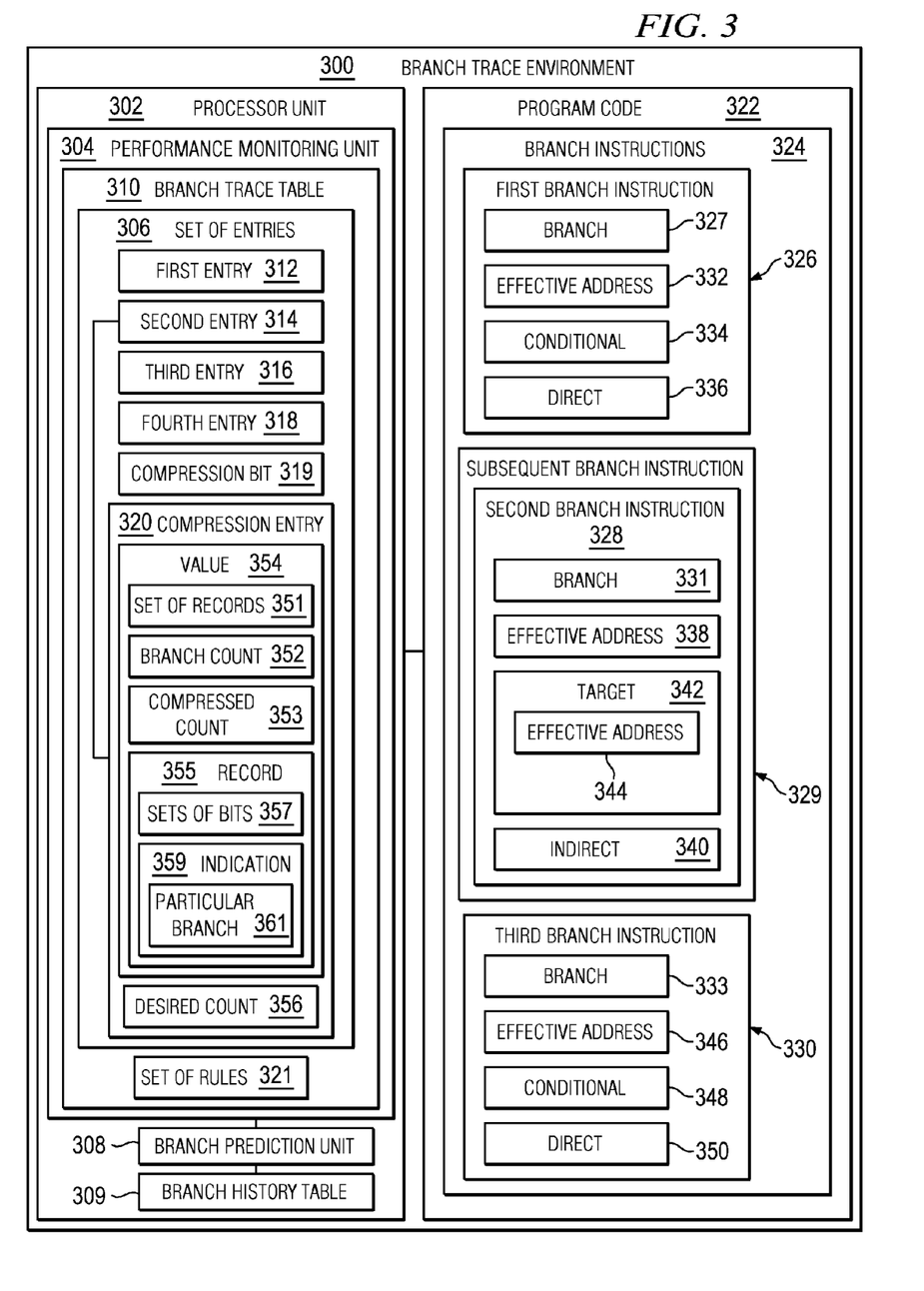
FIG. 3 is an illustration of a block diagram of a branch trace environment depicted in accordance with an advantageous embodiment.

Turning to FIG. 3, an illustration of a block diagram of a branch trace environment is depicted in accordance with an advantageous embodiment. Branch trace environment 300 is an example of an environment that may be implemented to process instructions in data processing system 100 in FIG. 1. Branch trace environment 300 includes processor unit 302. Processor unit 302 is an example implementation of processor 210 of FIG. 2, and/or data processing system 100 in FIG. 1.

In this illustrative example, processor 302 includes performance monitoring unit 304. Performance monitoring unit 304 is an example of one implementation of performance monitoring unit 240 in FIG. 2. Performance monitoring unit 304 includes branch trace table 310. Branch trace table 310 may be one example of one implementation of branch trace table 241 in FIG. 2.

Branch history table 309 stores branch predictions made by branch prediction unit 308. Branch trace table 310 may store addresses for each branch instruction retired. Branch trace table 310 stores the addresses in set of entries 306. Set of entries 306 includes first entry 312, second entry 314, third entry 316, and fourth entry 318. In different illustrative embodiments, any set of entries may exist. Set of entries 306 also includes compression entry 320. Branch trace table 310 may comprise set of rules 321. Set of rules 321 are used by branch trace table 310 and processor unit 302 to identify when a compression entry should be created.

Branch trace environment 300 also includes program code 322. Program code 322 may be one example of one implementation of program code 118 in FIG. 1. Program code 322 includes branch instructions 324. Branch instructions 324 are points in program code 322 where a choice is made as to which of two or more paths should be followed.

An instruction that causes a branch, a branch instruction, can be taken or not taken. If a branch is not taken, the flow of control is unchanged and the next instruction to be executed is the instruction immediately following the current instruction in memory. If a branch is taken, the next instruction to be executed is an instruction at some other place in memory. Branch instructions 324 may be conditional or unconditional. Conditional branch instructions are branch instructions which may or may not be taken depending on a condition, such as a processor flag. Unconditional branches are always taken. Branch instructions 324 may also be direct or indirect. Direct branches specify the address of the next instruction to process. Indirect branches look to other locations for the address of the next instruction, the target instruction, such as a register and/or memory.

In these illustrative embodiments, branch instructions 324 includes first branch instruction 326, second branch instruction 328, and third branch instruction 330. Second branch instruction 328 is subsequent branch instruction 329 in these examples. Subsequent branch instruction 329 is a branch instruction that occurs at some point during the processing of first branch instruction 326. Subsequent branch instruction 329 may or may not be the next branch instruction that occurs. In different illustrative embodiments, there may be more or less branch instructions. First branch instruction 326 includes branch 327, second branch instruction 328 includes branch 331, third branch instruction 330 includes branch 333. Branches 327, 331, and 333 are points in program code 322 that processor unit 302 may skip to other points in program code 322.

First branch instruction 326 comprises effective address 332. Effective address 332 is the value which is used by a fetch or store operation to specify which memory location is to be accessed by the operation from the perspective of the entity issuing the operation. The entity may be a process, thread, interrupt handler, kernel component, or other type of entity. First branch instruction 326 may also be conditional 334 and direct 336. In different illustrative embodiments, first branch instruction 326 is unconditional and/or indirect.

Second branch instruction 328 comprises effective address 338. Second branch instruction 328 may also be indirect 340. Second branch instruction 328 includes target 342. Target 342 is the target instruction of second branch instruction 328.

Effective address 344 of target 342 is not located within second branch instruction 328. Second branch instruction 328 looks to other locations in memory to identify effective address 344 of target 342.

Third branch instruction 330 comprises effective address 346. Third branch instruction 330 may also be conditional 348 and direct 350. In different illustrative embodiments, third branch instruction 330 is unconditional and/or indirect.

Branch prediction unit 308 identifies whether branches are taken or not taken. Branch trace table 310 records effective addresses for branches. Branch trace table 310 counts branch instructions which are conditional and direct not taken between conditional and direct branch instructions which are taken to form branch count 352. Branch count 352 is the number of conditional and direct branches not taken following a first conditional and direct branch up until the next conditional and direct branch taken. A first conditional and direct branch is a branch for which an effective address is recorded. The effective address for a first conditional and direct branch is recorded when compression entry 320 does not yet exist, compression entry 320 is full, or a newly created compression entry 320 would exceed the size of compression entry 320. For every conditional and direct branch which is not taken but is reached in program code 322, branch count 352 is incremented. Set of entries 306 comprises compression bit 319. Compression bit 319 is an indication of whether compression entry 320 exists.

Value 354 may comprise compressed count 353 and branch count 352. Value 354 may indicate compressed count 353, branch count 352, or a combination thereof. Value 354 may be branch count 352 incremented by one. Record 355 includes set of bits 357. Each bit of set of bits 357 included in record 355 indicates a characteristic of a branch instruction, such as first branch instruction 326. A bit in set of bits 357 may indicate whether the branch was taken or not taken. Another bit in set of bits 357 may indicate whether a prediction of whether the branch would be taken is correct. Set of bits 357 may also indicate other characteristics. Record 355 may also include indication 359. Indication 359 may be an indication of whether a branch was taken, such as branch 331. Indication 359 may be an indication of whether particular branch 361 is taken. Particular branch 361 may be any branch identified in particular. Each particular branch 361 may be stored as a record, such as record 355. Compressed count 353 may be a count of records, such as record 355 in compression entry 320. Each record 355, contained within set of records 351 indicates that a particular branch in the each branch was not taken in processing the branch instructions.

Compression entry 320 also includes desired count 356. Desired count 356 is based on the size of compression entry 320. For example, if compression entry 320 is a 64-bit entry, then desired count may be 28. In different illustrative embodiments, compression entry 320 may be a 128-bit entry; accordingly, desired count may be 60.

The illustration of instruction tracking environment 300 in FIG. 3 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, program code 322 may comprise other branch instructions. Additionally, in some illustrative embodiments, branch prediction unit 308 may be part of branch trace table 310 or vice versa.

Figure 4:
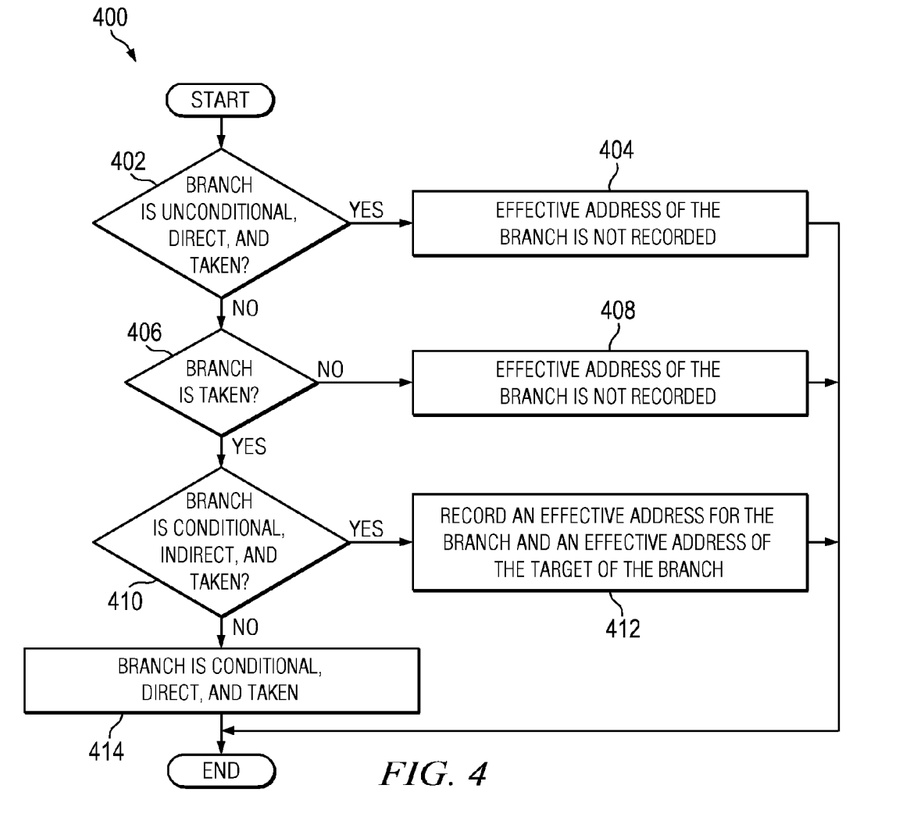
FIG. 4 is a flowchart of a process for determining whether to record an entry in the branch trace table in accordance with an illustrative embodiment.

Turning to FIG. 4, a flowchart of a process for determining whether to record an entry in a branch trace table in accordance with an illustrative embodiment is depicted. Process 400 illustrated in FIG. 4 may be implemented in performance monitoring unit 240 in FIG. 2. Process 400 illustrated in FIG. 4 may also be implemented in branch trace environment 300 in FIG. 3. Process 400 may be part of set of rules 321 in FIG. 3.

Process 400 begins by determining whether a branch is unconditional, direct, and taken (step 402). If the branch is unconditional, direct, and taken, the effective address of the branch is not recorded (step 404). The branch prediction unit determines whether the branch is taken (step 406). If the branch is not taken, the effective address of the branch is not recorded (step 408). In different illustrative embodiments, a branch count for branches not taken may be increased.

The branch prediction unit determines whether a branch is conditional, indirect, and taken (step 410). If the branch is conditional, indirect, and taken, the branch trace table records an effective address for the branch and an effective address of the target of the branch (step 412).

If the branch is not conditional, taken, and direct, the branch is conditional, direct, and taken (step 414). Thereafter, the process terminates.

Figure 5:
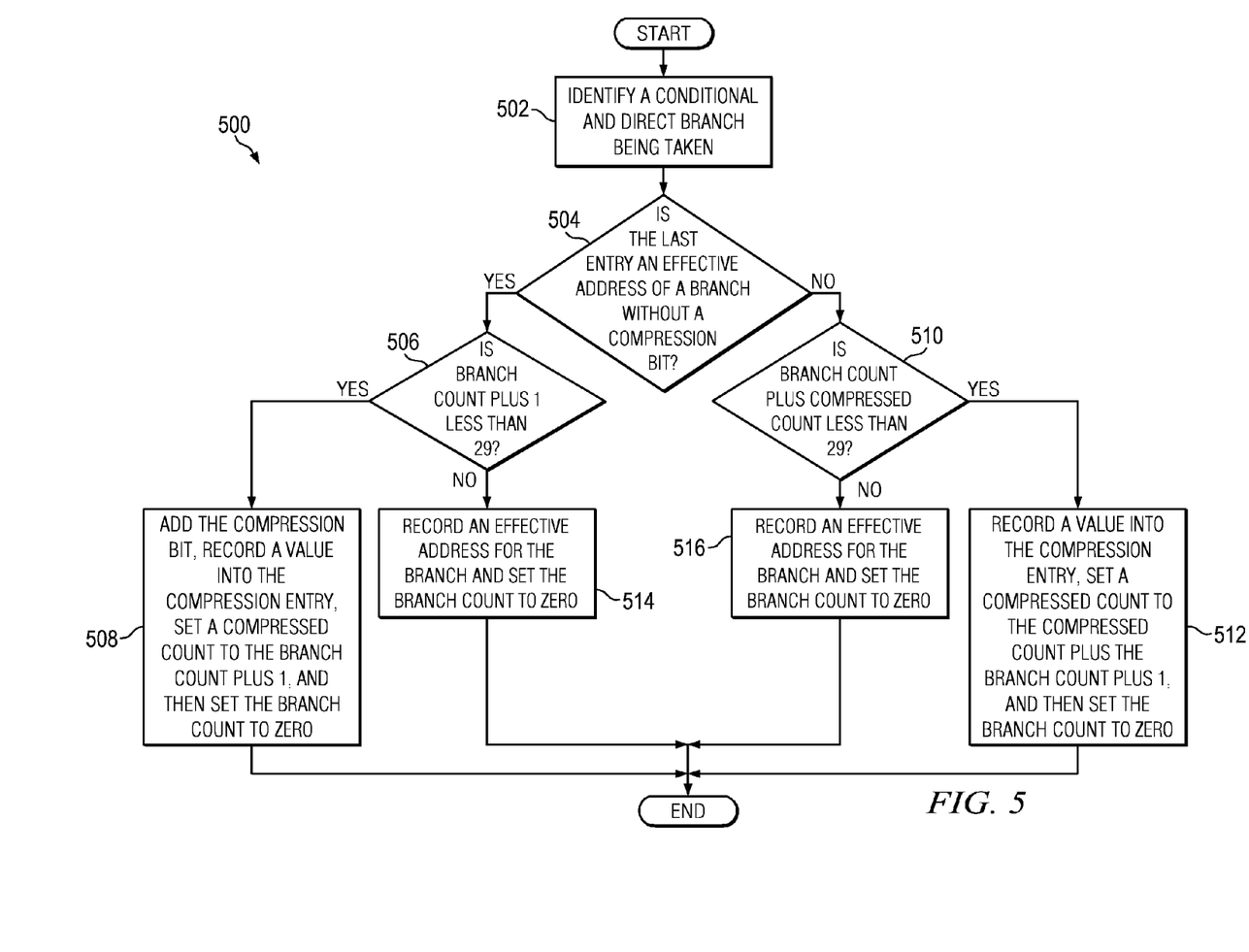
FIG. 5 is a flowchart of a process for determining whether to record a compression record in an entry of the branch trace table in accordance with an illustrative embodiment.

Turning to FIG. 5, a flowchart of a process for determining whether to record a compression record of an entry of the branch trace table in accordance with an illustrative embodiment is depicted. Process 500 illustrated in FIG. 5 may be implemented in performance monitoring unit 240 in FIG. 2. Process 500 illustrated in FIG. 5 may also be implemented in branch trace environment 300 in FIG. 3. Process 500 may be part of set of rules 321 in FIG. 3.

Process 500 begins by identifying a conditional and direct branch being taken (step 502). The branch trace table determines if the last entry is an effective address of a branch without a compression bit (step 504). The compression bit identifies whether a compression entry has already been started. If the last entry is an effective address of a branch without a compression bit, the branch trace table determines whether the branch count plus 1 is less than 29 (step 506). If the branch count plus 1 is less than 29, the branch trace table adds the compression bit, records a value into the compression entry, sets a compressed count to the branch count plus 1, and then sets the branch count to zero (step 508). If the branch count plus 1 is 29 or more then the compression entry is full. The branch count is the number of conditional and direct branches not taken in between conditional and direct branches which are taken. The value may be a record for each branch in the branch count and the current taken branch.

If, in step 504, the branch trace table determines that the last entry is an effective address of a branch with a compression bit, the branch trace table determines whether the branch count plus the compressed count is less than 29 (step 510). If the branch count is less than 29, then the branch trace table records a value into the compression entry, sets a compressed count to the compressed count plus the branch count plus 1, and then sets the branch count to zero (step 512).

If, in step 506, the branch count plus 1 is not less than 29, the branch trace table records an effective address for the branch and sets the branch count to zero (step 514). If, in step 510, the branch count plus the compressed count is not less than 29, the branch trace table records an effective address for the branch and sets the branch count to zero (step 516). Thereafter, the process terminates.

Process 500 is one example of one implementation of the illustrative embodiments when each entry in the branch trace table is 64-bits. In different illustrative embodiments, the entries in the branch trace table may be 128-bits or any number of bits. When the entries in the branch trace table are a different number of bits, the branch count and compressed count are compared to a different number instead of 29.

Figure 6:
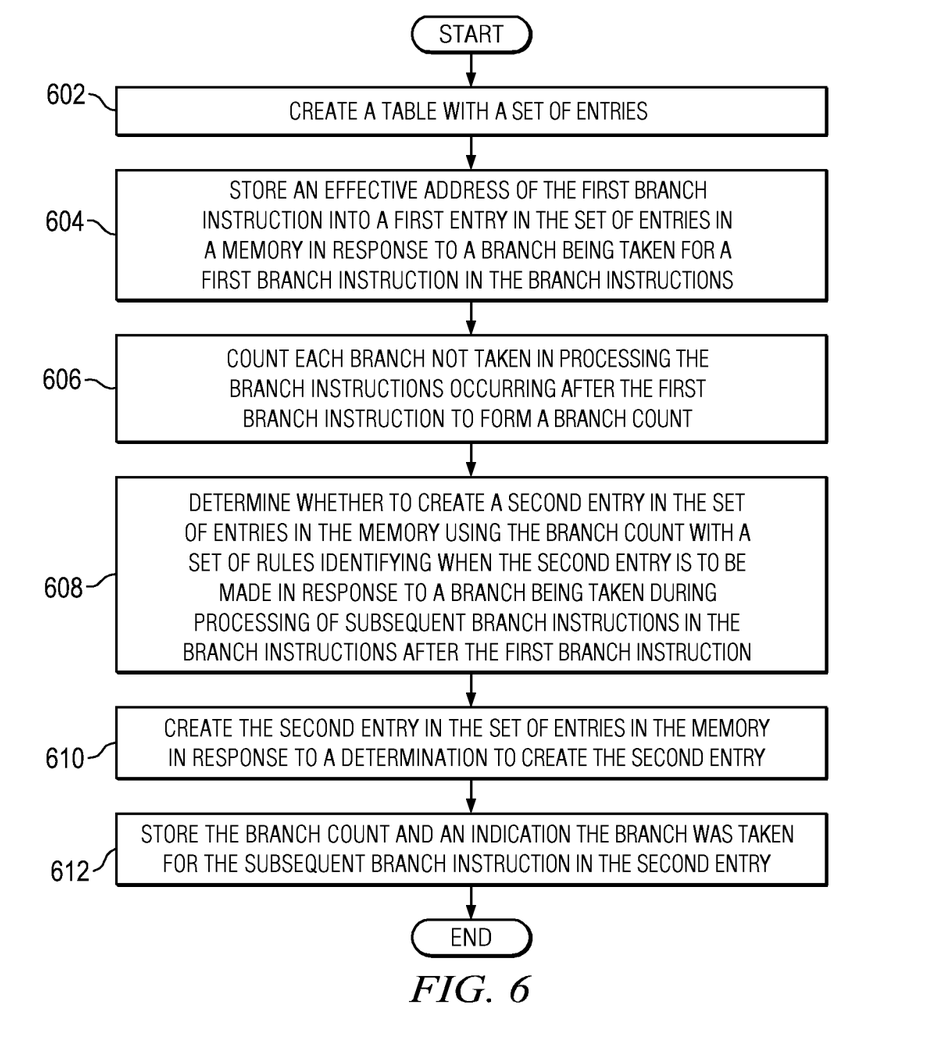
FIG. 6 is a flowchart of a process for monitoring processing of branch instructions in accordance with an illustrative embodiment.

Turning to FIG. 6, a flowchart of a process for monitoring processing of branch instructions in accordance with an illustrative embodiment is depicted. The process illustrated in FIG. 6 may be implemented in performance monitoring unit 240 in FIG. 2. The process illustrated in FIG. 6 may also be implemented in branch trace environment 300 in FIG. 3.

The process begins by the branch trace table creating a table with a set of entries (step 602). A performance monitoring unit stores an effective address of the first branch instruction into a first entry in the set of entries in a memory in response to a branch being taken for a first branch instruction in the branch instructions (step 604). The first branch is conditional and direct. The performance monitoring unit counts each branch not taken in processing the branch instructions occurring after the first branch instruction to form a branch count (step 606). The performance monitoring unit determines whether to create a second entry in the set of entries in the memory using the branch count with a set of rules identifying when the second entry is to be made in response to a branch being taken during processing of subsequent branch instructions in the branch instructions after the first branch instruction (step 608). The performance monitoring unit creates the second entry in the set of entries in the memory in response to a determination to create the second entry (step 610). The performance monitoring unit stores the branch count and an indication the branch was taken for the subsequent branch instruction in the second entry (step 612). Thereafter, the process terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the different illustrative embodiments provide a method and apparatus for tracking branch histories. This disclosure proposes a hardware table that uses compression techniques to help mitigate the large area overheads associated with these structures. The compression techniques allow larger branch history profiles to be recorded at a fraction of the area cost compared to current designs.

A method and apparatus for monitoring processing of branch instructions. In response to a branch being taken for a first branch instruction that is conditional and direct in the branch instructions, a performance monitoring unit stores an effective address of the first branch instruction into a first entry in a set of entries in a memory. The performance monitoring unit counts each branch not taken in processing the branch instructions occurring after the first branch instruction to form a branch count. In response to a branch being taken during processing of subsequent branch instructions in the branch instructions after the first branch instruction, the performance monitoring unit determines whether to create a second entry in the set of entries in the memory using the branch count with a set of rules identifying when the second entry is to be made. In response to a determination to create the second entry, the performance monitoring unit, i) creates the second entry in the set of entries in the memory; and ii) stores the branch count and an indication the branch was taken for the subsequent branch instruction in the second entry.

The terminology used herein is for the purpose of describing particular embodiments only, and is not intended to be limiting of the invention. As used herein, the singular forms "a", "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring processing of branch instructions in a computer system, the method comprising:
    responsive to a branch being taken for a first branch instruction that is conditional and direct in the branch instructions, storing, by a performance monitoring unit, an effective address of the first branch instruction into a first entry in a set of entries in a memory;
    counting, by the performance monitoring unit, each branch not taken in processing branch instructions occurring after the first branch instruction to form a branch count;
    responsive to a branch being taken during processing of subsequent branch instructions in the branch instructions occurring after the first branch instruction, determining, by the performance monitoring unit, whether to create a second entry in the set of entries in the memory using the branch count with a set of rules identifying when the second entry is to be made;
    responsive to a determination to create the second entry:
        i) creating, by the performance monitoring unit, the second entry in the set of entries in the memory; and
        ii) storing, by the performance monitoring unit, the branch count and an indication the branch was taken during processing of subsequent branch instructions for a subsequent branch instruction in the second entry.

2. The method of claim 1, wherein the step of storing, by the performance monitoring unit, the branch count and the indication that the branch was taken in the second entry comprises:
    storing, by the performance monitoring unit, a number of records, of a set of records, equal to a number of counted branches in the branch count in the second entry, wherein each record in the set of records indicates that a particular branch in the each branch was not taken in processing the branch instructions; and
    storing, by the performance monitoring unit, a record for the branch taken for the subsequent branch instruction in the second entry.

3. The method of claim 2 further comprising:
    responsive to a branch being taken during processing of a third branch instruction that is conditional and direct, determining, by the performance monitoring unit, whether a compression bit exists.

4. The method of claim 3 further comprising:
    responsive to a determination that the compression bit does not exist, determining, by the performance monitoring unit, whether a value of the branch count incremented by one exceeds a desired branch count;
    responsive to the value of the branch count incremented by one not exceeding the desired branch count, adding, by the performance monitoring unit, the compression bit to a branch trace table;
    responsive to the value of the branch count incremented by one not exceeding the desired branch count, storing, by the performance monitoring unit, into a compression entry, a record for each branch counted in the branch count and a record for the third branch instruction;
    responsive to the value of the branch count incremented by one exceeding the desired branch count, storing, by the performance monitoring unit, an effective address of the third branch instruction into the branch trace table; and
    setting, by the performance monitoring unit, the branch count to zero.

5. The method of claim 3 further comprising:
    responsive to a determination that the compression bit exists, determining, by the performance monitoring unit, whether a value of the branch count added to a number of records in the second entry exceeds a desired branch count;
    responsive to the value of the branch count added to a number of records not exceeding the desired branch count, storing, by the performance monitoring unit, into a compression entry a record for each branch counted in the branch count and a record for the third branch instruction;
    responsive to the value of the branch count added to a number of records exceeding the desired branch count, storing, by the performance monitoring unit, an effective address of the third branch instruction into a branch trace table; and
    setting, by the performance monitoring unit, the branch count to zero.

6. The method of claim 1 wherein storing, by a performance monitoring unit, an effective address of the first branch instruction into a first entry in a set of entries in a memory further comprises:
    creating, by the performance monitoring unit, a branch trace table for storing the set of entries in the memory.

7. The method of claim 1 further comprising:
    wherein the subsequent branch instruction in the branch instructions occurring after the first branch instruction is a second branch instruction;
    responsive to the branch being taken during processing of the second branch instruction that is indirect, storing, by the performance monitoring unit, an effective address of the second branch instruction in a third entry in the set of entries; and
    responsive to the branch being taken during processing of the second branch instruction, storing, by the performance monitoring unit, an effective address of a target of the second branch instruction in a fourth entry in the set of entries.

8. The method of claim 1, wherein the branch count is representative of a set of branches not taken between taken branches, wherein the set of branches are conditional and direct.

9. The method of claim 1 further comprising:
responsive to storing, by the performance monitoring unit, a value for the branch of a set of branches in the memory, resetting the branch count.

10. A data processing system comprising:
a bus system;
a memory connected to the bus system;
a processor unit connected to the bus system;
a branch trace table comprising a set of entries in the memory, wherein the branch trace table is configured to store an effective address of a first branch instruction into a first entry in the set of entries in the memory in response to a branch being taken for the first branch instruction, in branch instructions, that is conditional and direct; count each branch not taken in processing branch instructions occurring after the first branch instruction to form a branch count; and
a performance monitoring unit configured to determine whether to create a second entry, in the set of entries in the memory, using the branch count with a set of rules identifying when the second entry is to be made in response to a branch being taken during processing of subsequent branch instructions in the branch instructions occurring after the first branch instruction, responsive to a determination to create the second entry:
  i) create the second entry in the set of entries in the memory; and
  ii) store the branch count and an indication the branch was taken during processing of subsequent branch instructions for a subsequent branch instruction in the second entry.

11. The data processing system of claim 10, wherein the performance monitoring unit configured to store the branch count and the indication that the branch was taken in the second entry comprises:
the performance monitoring unit configured to store a number of records, of a set of records, equal to a number of counted branches in the branch count in the second entry, wherein each record in the set of records indicates that a particular branch in the each branch was not taken in processing the branch instructions; and store a record for the branch taken for the subsequent branch instruction in the second entry.

12. The data processing system of claim 10, wherein the performance monitoring unit is further configured to create the branch trace table with the set of entries in the memory.

13. The data processing system of claim 10, wherein the subsequent branch instruction in the branch instructions occurring after the first branch instruction is a second branch instruction, wherein the performance monitoring unit is configured to store, into the set of entries in the memory, an effective address of the second branch instruction in a third entry in the set of entries in the memory in response to the branch being taken during processing of the second branch instruction that is indirect; and store, into the memory, an effective address of a target of the second branch instruction in a fourth entry in the set of entries in response to the branch being taken during processing of the second branch instruction.

14. The data processing system of claim 10, wherein the performance monitoring unit is configured to determine whether to create a compression entry and further configured to determine whether a compression bit exists in response to a branch being taken during processing of a third branch instruction that is conditional and direct.

15. A computer program product comprising:
a computer usable non-transitory storage medium including computer usable program code stored thereon for monitoring processing of branch instructions, the computer usable program code comprising:
computer usable program code for storing an effective address of a first branch instruction into a first entry in a set of entries in a memory in response to a branch being taken for the first branch instruction that is conditional and direct in the branch instructions;
computer usable program code for counting each branch not taken in processing branch instructions occurring after the first branch instruction to form a branch count;
computer usable program code for determining whether to create a second entry in the set of entries in the memory using the branch count with a set of rules identifying when the second entry is to be made in response to a branch being taken during processing of subsequent branch instructions in the branch instructions occurring after the first branch instruction;
computer usable program code responsive to a determination to create the second entry, for:
  i) creating the second entry in the set of entries in the memory; and
  ii) storing the branch count and an indication the branch was taken during processing of subsequent branch instructions for a subsequent branch instruction in the second entry.

16. The computer program product of claim 15 further comprising:
computer usable program code for creating a table with the set of entries in the memory.

17. The computer program product of claim 15 further comprising:
wherein the subsequent branch instruction in the branch instructions occurring after the first branch instruction is a second branch instruction;
computer usable program code responsive to the branch being taken during processing of the second branch instruction that is indirect, for storing an effective address of the second branch instruction in a third entry in the set of entries in the memory; and
computer usable program code responsive to the branch being taken during processing of the second branch instruction, for storing an effective address of a target of the second branch instruction in a fourth entry in the set of entries in the memory.

* * * * *